Dec. 9, 1958    R. F. THIELMAN    2,863,973
CARBON PILE REGULATOR
Filed Nov. 7, 1955

INVENTOR.
RUSSELL F. THIELMAN
BY
ATTORNEY

United States Patent Office 2,863,973
Patented Dec. 9, 1958

2,863,973

CARBON PILE REGULATOR

Russell F. Thielman, Cleveland, Ohio, assignor to Jack & Heintz, Inc., Cleveland, Ohio, a corporation of Delaware Application November 7, 1955, Serial No. 545,371

1 Claim. (Cl. 201—51)

This invention relates in general to electromagnetic regulators and more particularly to voltage regulators of the carbon pile type. An electromagnet is used in carbon pile type regulators which provides a force which varies as the square of the regulated voltage. Acting in opposition to the magnet force is a mechanical spring. The difference in force level between the electromagnet and spring is applied as an axial compressive load to the stack of carbon discs. This compressive force varies the air gap between adjacent flat surfaces of the discs, thus changing the resistance of the carbon stack. The force created by the electromagnet is approximately equal to the opposing spring force during operation of the regulator and is approximately twenty times the force transmitted to the stack of carbon discs.

A prime requirement, therefore, is that the spring force should closely parallel the magnet force within the operating deflection range of the voltage regulator. Since the magnet force varies inversely as the square of the magnet air gap, the optimum force deflection characteristic of the spring would appear to be non-linear in nature, at least in the range of deflection used for voltage regulation. The effects of hysteresis and variable friction make it desirable to use a mechanical spring whose force is somewhat greater than that of the magnet.

Furthermore, it is possible to achieve good voltage regulation by means of a spring which does not have a non-linear force-deflection curve. Such a spring may have a force-deflection characteristic consisting of two linear functions, the first linear range being of lesser slope than the latter range.

In United States Letters Patent to Newton, 2,268,718, of January 6, 1942, and Newton, 2,363,612, of November 28, 1944, there is a linear portion followed by a non-linear portion. The linear portion is obtained by the spring acting as a simple cantilever beam prior to the end becoming tangent to the inclined abutment in Newton 2,268,718 or tangent to the other spring in Newton 2,363,612. Up to this point, the active length of the spring is constant. After the spring wrapping action starts to take place, the lever arm of the spring is shortened so as to cause an increase in the force rate of the spring. This results in a second non-linear portion of the spring curve following the first linear portion.

One of the primary objects of my invention is to provide a carbon pile regulator spring having a force deflection characteristic consisting of two linear portions, as compared to a regulator spring having a linear and non-linear portion.

Another object is to accomplish this force-deflection characteristic by means of a single flat spring, thus eliminating secondary springs or auxiliary supports.

A further object of this invention is to supply a spring assembly in which the load is applied to the radial extremities of the leaves of the flat spring during the first linear deflection range until contact is made with a ring type support located on the opposite side of the spring and having no motion relative to the fixed end of the spring. When this new and novel spring is deflected past the point of contact of this support ring, a reactive force is supplied to the spring leaves which is opposite in direction to that force applied at the radial extremities of the spring leaves. This reactive force alters the moment distribution on the spring leaves and its effect is to increase the force rate of the spring yielding a second portion of the force deflection curve which is of a steeper slope than the first portion.

The transition from the first spring slope to the second is accomplished instantaneously when the support ring contacts the spring leaves. Consequently there is no non-linear portion of the force deflection curve, the transition between the lower slope and higher slope taking place at a point only.

I am aware of the United States Letters Patent of O. C. Walley, No. 2,720,571, October 11, 1955, in which a deflection ring consisting of several radial spring supports is used in conjunction with a single flat spring. The essential differences between this invention and mine are as follows:

Walley's design utilizes several concentric deflection supports which are so situated as to have relative motion with the fixed end of the spring, that is, the electromagnetic armature. As the spring is deflected, the load is taken entirely on the outermost deflection ring. Continued deflection brings the next inner deflection ring, which is recessed with respect to the outer ring, into contact with the spring leaves. As the deflection is increased, the load is transferred from the outer to the inner ring entirely. When all the load is carried by the inner deflection ring, the effective length of the spring leaves has been reduced and a stiffer spring results. The transition of load, however, gives a non-linear characteristic which ceases when the load transfer is complete after which a steeper slope linear rate takes place.

One of the objects of my invention is to provide a single flat spring for carbon pile regulators with a force deflection curve consisting of two linear portions, the latter being of a steeper slope than the former. A further object of this invention is to provide this force deflection characteristic without the use of inclined abutments or two like opposing springs or fixed concentric deflection rings.

With the foregoing and other objects in view, my invention resides in the combination of parts and in the details of construction hereinafter set forth in the following specification and appended claim, certain embodiments thereof being illustrated in the accompanying drawings, in which:

Figure 1:
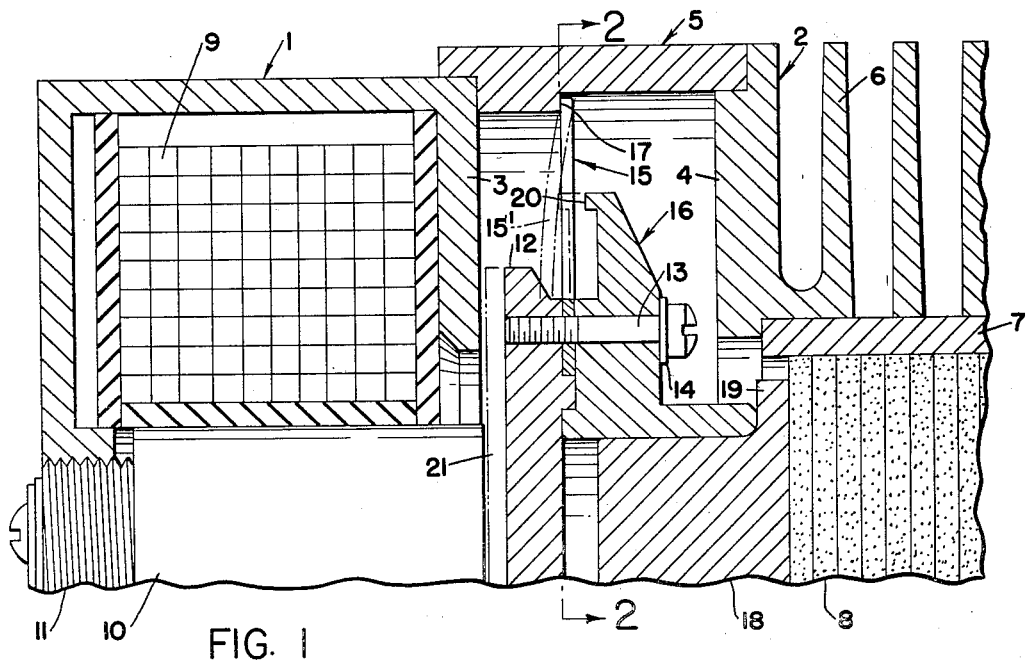
Figure 1 is a view in vertical longitudinal section taken through the carbon pile regulator constructed in accordance with my invention.

Referring more particularly to the drawings, I have shown a carbon pile regulator including an electromagnet housing 1 and a carbon pile stack housing 2. Housing 1 has an inner end wall 3 and housing 2 an inner end wall 4 axially spaced from wall 3. Suitably secured to walls 2 and 3 is a housing section 5.

Housing 2 is preferably provided with radiating fins 6. Suitably mounted in housing 2 is a sleeve 7, inside of which are loosely mounted a series of separate carbon discs 8.

Inside of housing 1 is an electromagnet 9 and a core 10 which latter is screw-threaded at 11 to be axially adjustably secured to the housing.

Inside of housing 5, I suitably mount an armature 12 to be axially movable. By means of suitable bolts 13 and washers 14, I secure a multi-leaf flexible spring, generally indicated at 15, to a spring support ring 16, the spring 15 being disposed axially between the armature 12 and ring 16 and the bolts 13 passing through the armature, spring and ring. Inside the inner surface of housing 5, I provide a shoulder 17. The support ring 16 may be axially slidable on a pressure block 18 to abut shoulder 19 to apply compressive pressure on the carbon pile stack 8 under the spring pressure of spring 16. The spring support ring 16 preferably has a circular flange 20 near its outer periphery to extend toward the spring 15.

Figure 1, in full lines, represents the regulator assembly at rest. In this position, there is a gap 21 between armature 12 and end wall 3. Through the abutment of the cantilever leaves of spring 15 with the shoulder 17 of housing 5, maximum spring pressure is applied through ring 16 and block 18 to exert maximum resilient compressive action on the carbon disc stack 8 to leave minimum axial clearance between the carbon discs.

Figure 2:
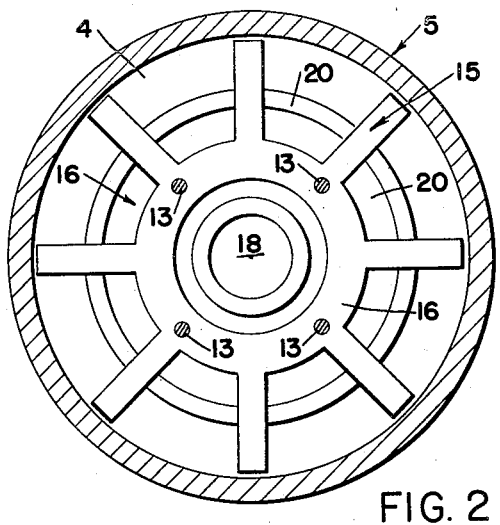
Figure 2 is a view in section taken along line 2—2 of Figure 1 on an enlarged scale to show the configuration of the carbon pile regulator spring.
Figure 3:
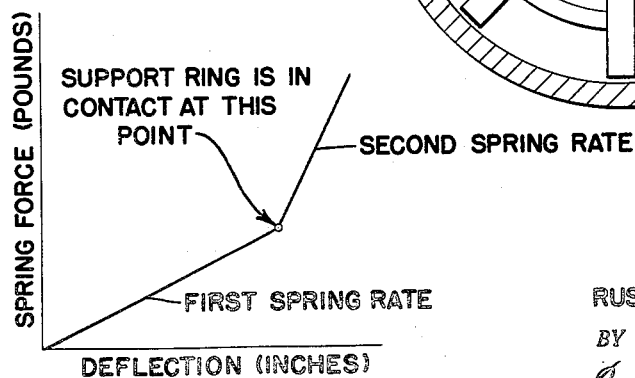
Figure 3 is a graph showing the spring force and deflection of the spring in its two linear functions.

As the magnet force of the electromagnet attracts the movable armature 12 toward the adjustable core 10, the cantilever leaves of the spring 15 are deflected by being restrained by the shoulder 17 of housing 5. When the flanges 20 of the support ring 16 come into contact with the leaves of spring 15, a reactive force is applied to the leaves that is opposite in direction to the reaction when the spring leaves are in contact only with housing shoulder 17 and not in contact with the support ring 16. The application of the force at the support ring 16 deflects the spring 15 into the dotted line position of 15'. This alters the moment distribution of the spring leaves and effectively reduces the active cantilever length, thus causing an immediate transition to a steeper spring rate. This is graphically illustrated in Figure 2. The amount of initial clearance between the spring leaves and the support ring determine at what deflection the second spring rate will start.

It should be borne in mind that my spring is physically secured only to the armature and support ring, leaving the outer ends of the leaves of the spring unsecured and free to flex throughout the radial lengths, both by abutment with shoulder 17 of the housing and with the flange 20 of the support ring.

Thus, it will be seen that I have provided a new and novel carbon pile regulator in which I am able to obtain a spring force deflection characteristic that is not dependent upon difficult to measure tolerances or uncalculable extraneous elastic effects and which will consist only of two linear portions, the transition taking place at a single point.

As previously stated, the conventional use of inclined abutments has caused extreme difficulty in obtaining consistent force-deflection characteristics. The dependency of the force-deflection characteristic upon the abutment angle requires tolerances which are extremely difficult to hold and almost impossible to check. Consequently, the rejection rate for this type of spring is abnormally high. These same reasons hold for two like opposing springs with spring leaves formed at an angle. The use of fixed concentric deflection rings gives a spring characteristic that is unfavorable to precise voltage regulation. The characteristic force deflection curve of this type yields a linear spring rate followed by an extremely steep nonlinear portion and subsequently by a second linear spring rate of steeper slope than the first.

My regulator spring does not transfer load from one support to another but due to the support ring being located on the opposite side of the spring leaves with respect to the primary radial support, a reactive force opposite in direction to the force applied at the leaf extremities is realized. Secondly, the support ring of my device has no motion relative to the fixed end of the spring. Contact occurs between spring and support ring when the travel of the armature holding the fixed end of the spring is sufficient to deflect the spring leaves back to the support ring.

The final difference is in the spring characteristics. My device has two linear spring rates, the latter being of a steeper slope than the former and the transition takes place instantaneously, at a single point. Walley's device yields a lower linear spring rate followed by a steep non-linear function as the load transition occurs and ending with a second linear spring rate of steeper slope than the first, but less than the slope of the non-linear portion.

Moreover, I avoid the necessity of all inclined abutments and their attendant production problems. I am able to employ one spring instead of the usual two springs. Since this spring approaches the classical cantilever in simplicity, there will be no extraneous uncalculable elastic effects and the performance of the springs can be controlled by a minimum of variables. The lesser number of parts required and the simplicity of assembly of my regulator materially reduces assembly time.

I claim:

In an electric regulator including a variable resistance carbon pile disc assembly, an electromagnet assembly including an armature, a spring carried by said armature to resist magnet pull in one axial direction and apply axial pressure in the other direction on said carbon pile, a spring support ring, a spring support member secured to said armature against relative movement to secure the central portion of said spring between said armature and said support ring with the support ring being on the axially opposite side of said spring from said armature, the radial outer portion of said spring being free and unattached to any part of the regulator, a stationary fulcrum member against which one axial side of the radial outer portion of said spring rests to apply in one direction a resilient axial compressive force upon said carbon pile and to resist magnet pull axially upon said armature in the other direction, a second fulcrum element carried by said support ring and spaced substantially from said fulcrum member and from said secured portion, and on the opposite axial side of said spring from said first fulcrum member, said second fulcrum member, upon continued progressively increasing magnet pull upon said armature, being adapted to be pulled axially to engage said spring intermediate of its radial dimensions in such a manner that said two fulcrums cause a continued deflection of said spring by movement of said armature toward said magnet to produce a spring deflection force curve consisting in two successive linear portions of different spring rates, with the second spring rate being the greater, the portion of said spring between the secured portion thereof and the zone of engagement with said second fulcrum member being out of contact with said spring support member.

References Cited in the file of this patent

UNITED STATES PATENTS

| | | |
|---|---|---|
| 2,268,718 | Newton | Jan. 6, 1942 |
| 2,363,612 | Newton | Nov. 28, 1944 |
| 2,441,059 | Creveling | May 4, 1948 |
| 2,627,007 | Richards | Jan. 27, 1953 |
| 2,720,571 | Walley | Oct. 11, 1955 |
| 2,773,156 | Lowry | Dec. 4, 1956 |